No. 795,100. PATENTED JULY 18, 1905.
J. W. BURTLESS & J. W. LITTLE.
HARVESTER.
APPLICATION FILED MAR. 26, 1904.
4 SHEETS—SHEET 4.
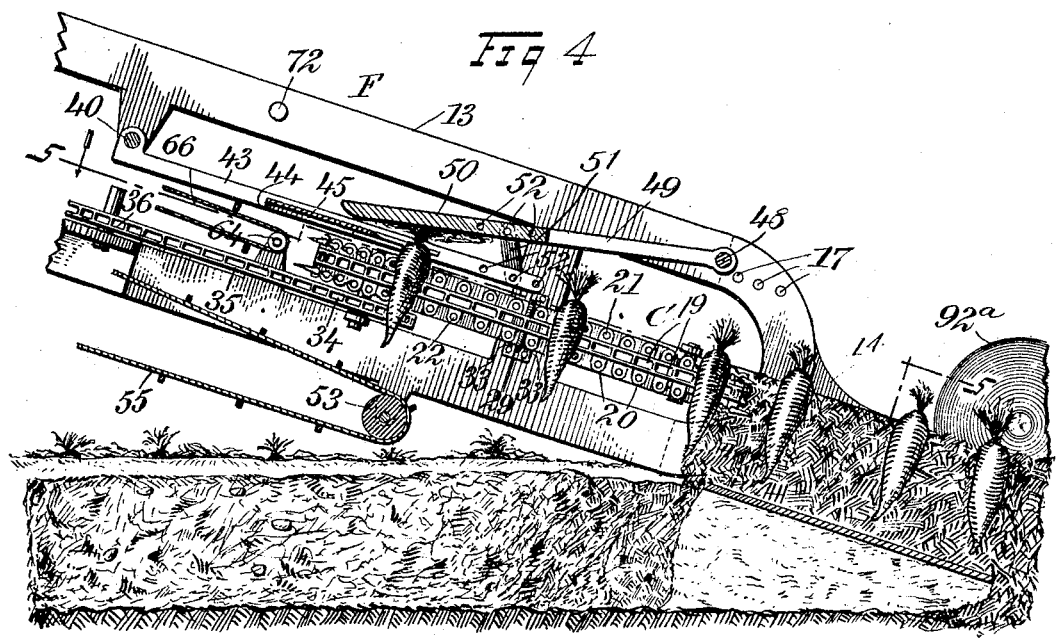
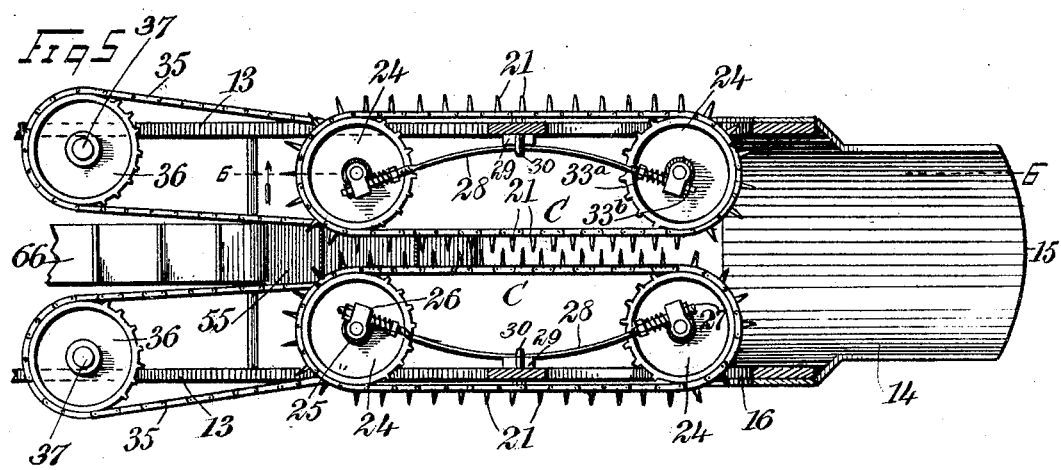
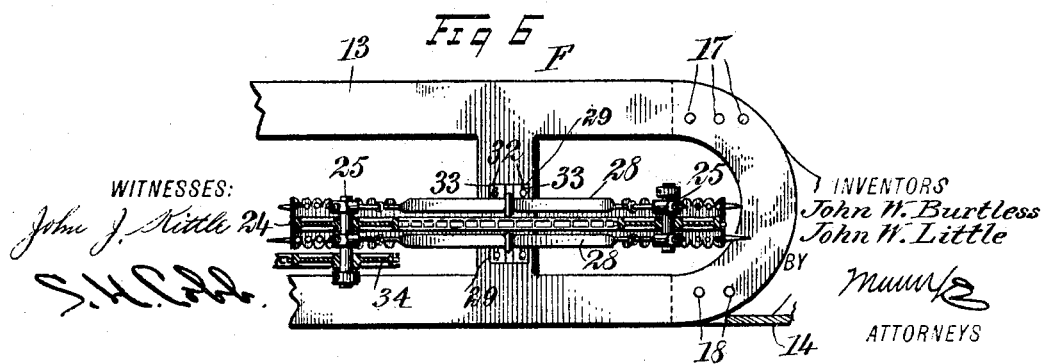
WITNESSES:
INVENTORS
John W. Burtless
John W. Little
BY
ATTORNEYS No. 795,100. Patented July 18, 1905.

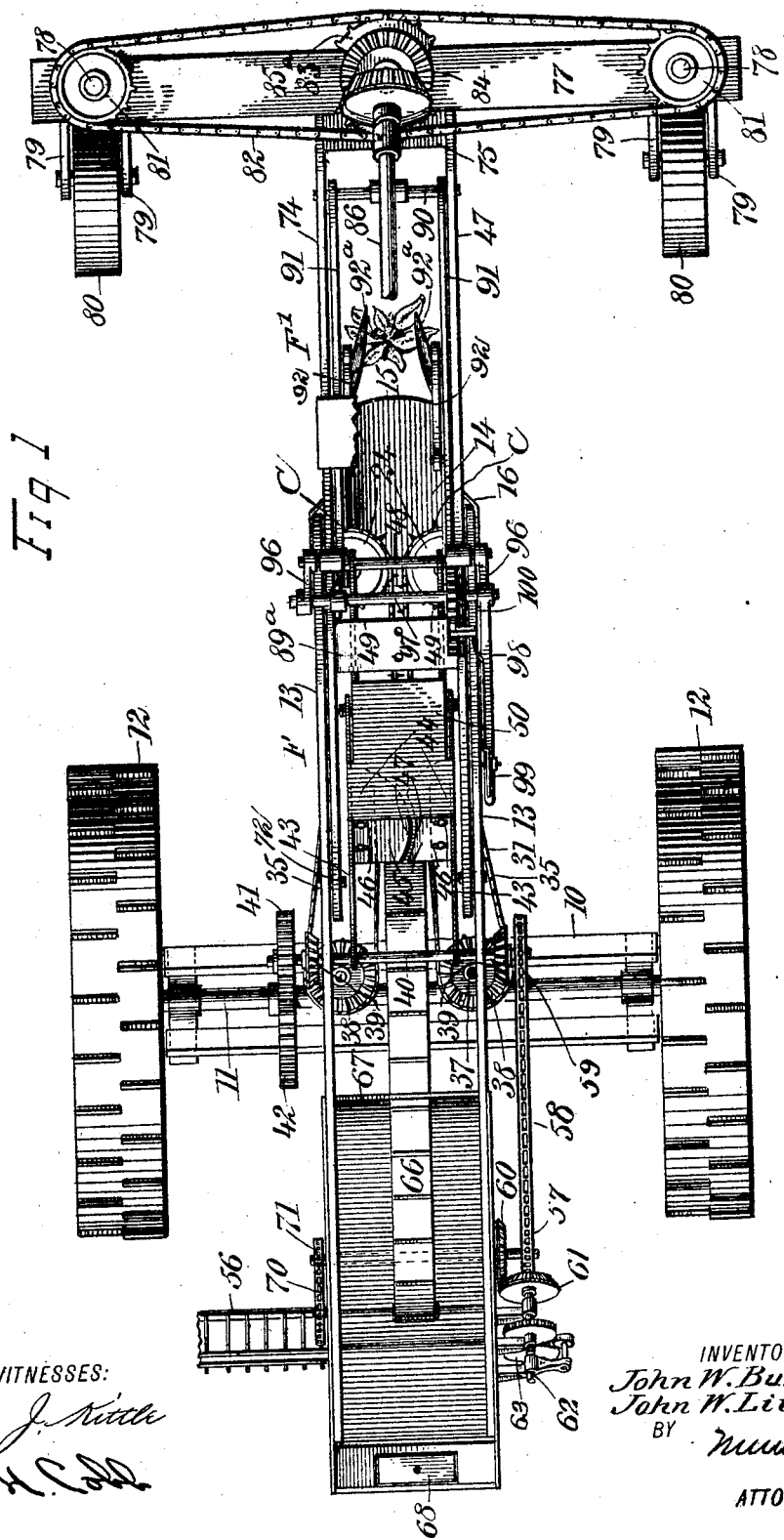

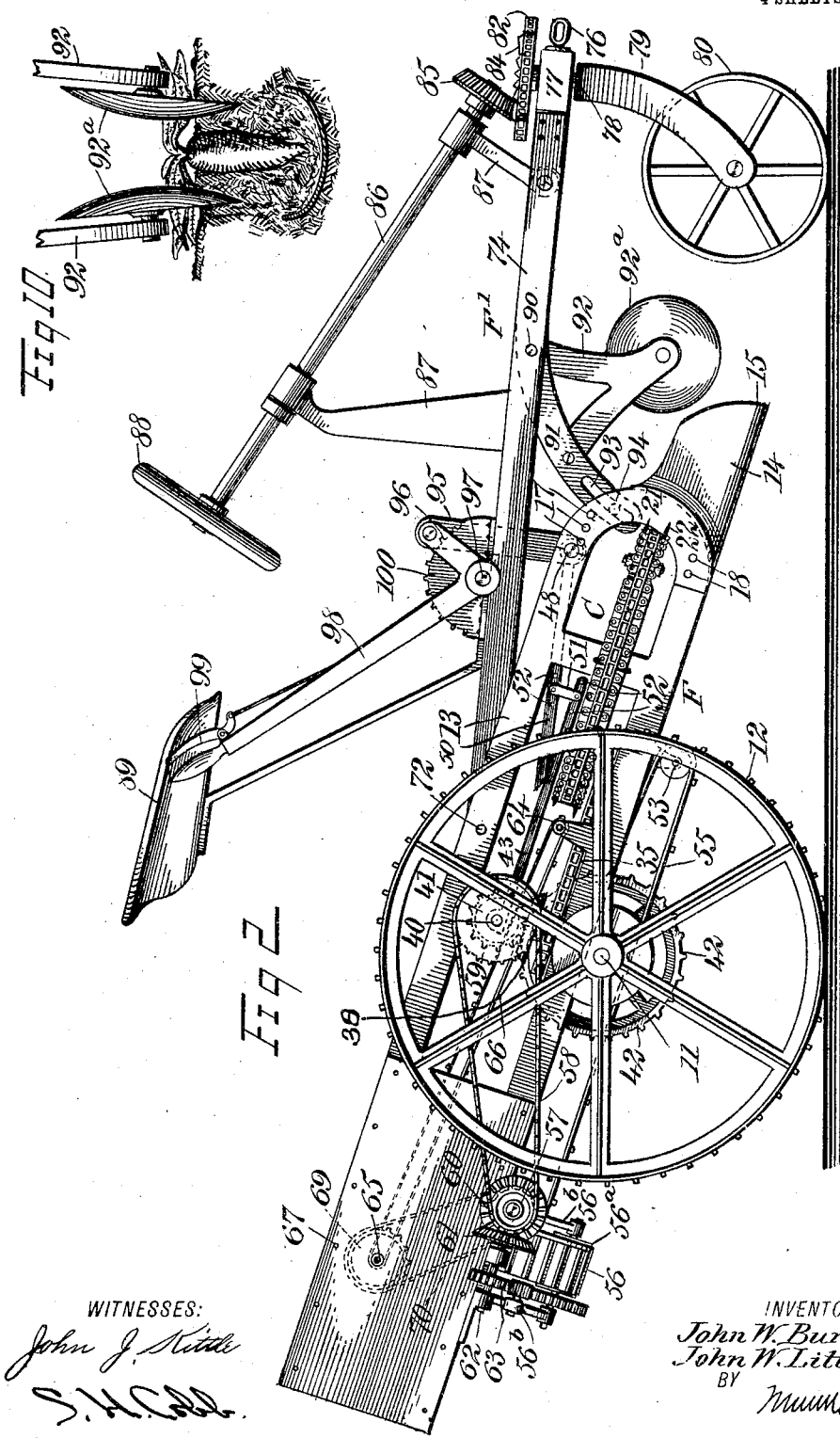

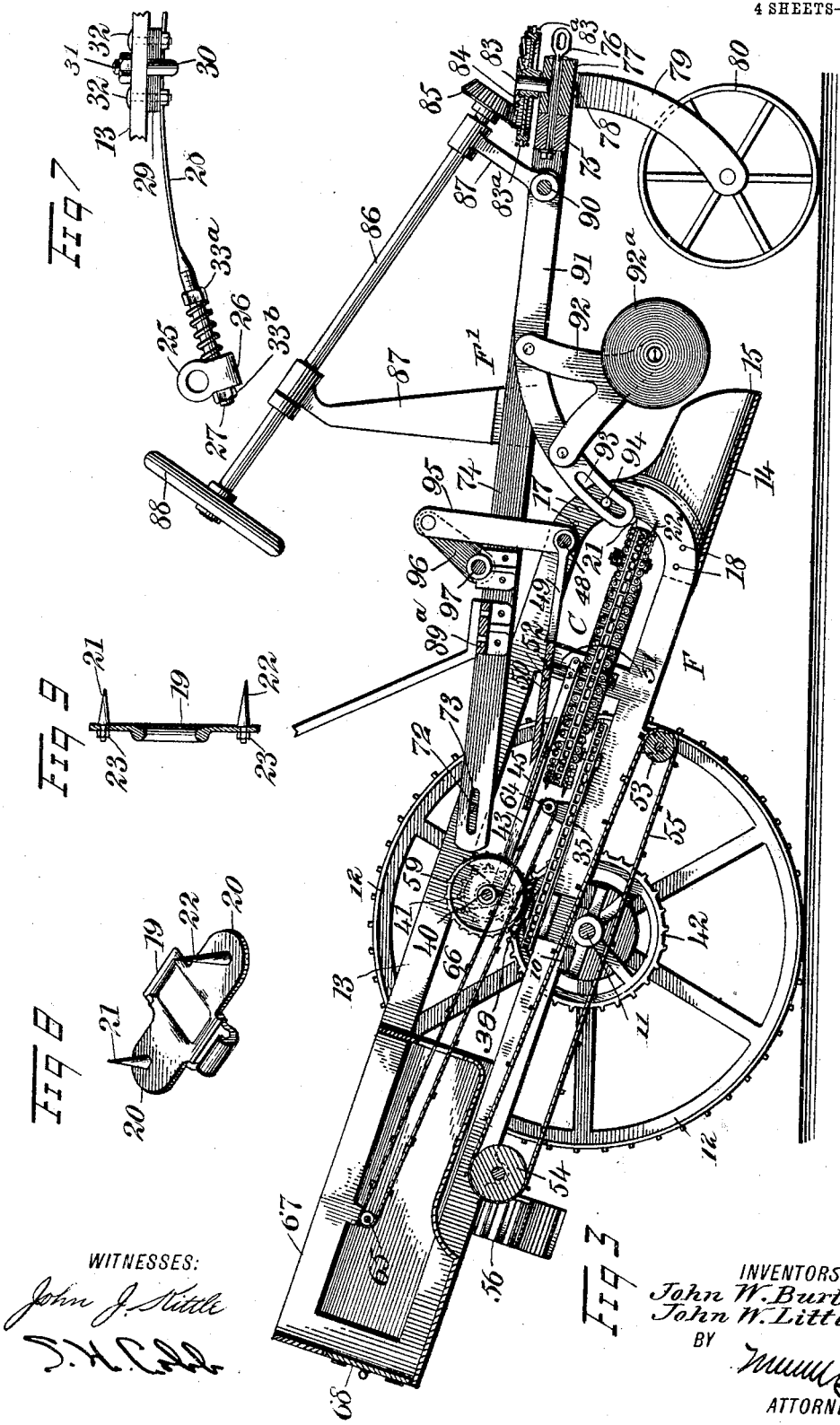

UNITED STATES PATENT OFFICE.

JOHN W. BURTLESS AND JOHN W. LITTLE, OF McCOOK, NEBRASKA.

HARVESTER.

SPECIFICATION forming part of Letters Patent No. 795,100, dated July 18, 1905.

Application filed March 26, 1904. Serial No. 200,079.

*To all whom it may concern:*

Be it known that we, JOHN W. BURTLESS and JOHN W. LITTLE, citizens of the United States, and residents of McCook, in the county of Red Willow and State of Nebraska, have invented a new and Improved Harvester, of which the following is a full, clear, and exact description.

Our invention relates to harvesters, and more particularly to those adapted for the digging and topping of such vegetables as beets. Its objects are to generally improve the construction and operation of these machines.

It consists in the various features and combinations hereinafter described and more particularly claimed.

Reference is to be had to the accompanying drawings, forming a part of this specification, in which similar characters of reference indicate corresponding parts in all the figures.

Figure 1 is a top plan view of one form of our invention, parts being broken away. Fig. 2 is a side elevation thereof. Fig. 3 is a central vertical longitudinal section. Fig. 4 shows the forward end of the inclined frame in operation. Fig. 5 is a horizontal section on the line 5 5 of Fig. 4. Fig. 6 is a vertical sectional detail on the line 6 6 of Fig. 5. Fig. 7 is a detail of the spring and its support by which the conveyer-chains are carried. Fig. 8 is a perspective view of one of the links of the conveyer-chain. Fig. 9 is a central vertical section therethrough, and Fig. 10 shows in front elevation the cutting-disks in operation.

10 designates the main bolster, in which is mounted the axle 11, carrying upon its opposite ends supporting and driving wheels 12 12. Supported on the bolster and swinging about the axle is a frame F, here shown as consisting of opposite side members 13 13, suitably secured together, normally occupying an inclined position with its forward end in proximity to the ground. Upon this lower end of the frame is mounted a digging member or scoop 14, which is preferably of general trough shape and has a forward-curved cutting edge 15. At the rear the scoop widens at 16 into a discharge portion, which allows free movement of earth therethrough. The sides of the scoop extend outside the ends of the frame, which is provided with upper and lower series of openings 17 and 18, respectively, the former having the greater number, here shown as three, while there are two in the lower series. Through these openings and a corresponding opening in the scoop for each series a pin may be placed and by varying its engagement will serve to adjust the scoop both longitudinally of the frame and in its angle thereto.

Supported upon the frame at the rear of the scoop are oppositely-situated coöperating conveyers C C, which are here illustrated as composed of links 19, from which are lateral extensions 20 20. Through openings in these extensions pass shanks of upper and lower spikes or projections 21 22, respectively, lying in a substantially horizontal position, the lower being the longer. These spikes are retained in place by nuts 23 and serve to aid the chains in grasping the vegetable which they are to convey, the difference in length permitting the lower spike to accommodate itself to the inclined form of such roots as beets. The conveyer-chains may be supported upon pairs of sprocket-wheels 24 24, each of which is journaled in a bearing 25, from which a perforated boss 26 projects. Through these perforations pass cylindrical portions 27 of pairs of bars or leaf-springs 28 28, situated one above the other at each side of the frame. Each pair of springs may be secured to blocks 29 by U-bolts 30, upon the outer ends of which are retaining-nuts 31. These blocks are shown as adjustable laterally of the frame by bolts 32, passing through the frame and through slots 33 in the blocks, and the springs are also adjustable longitudinally through the bolts. The opposite ends of each of the cylindrical portions of the spring are threaded, and upon these threads are the nuts $33^b$ and $33^a$. The former serves as a stop for the bearing, while between the said bearing and the other nut $33^a$ is located a spiral spring encircling the enlargement, permitting some yield of the sprocket-wheels toward one another, the resistance to movement being variable by an adjustment in the position of the nut.

Each of the rear sprocket-wheels carries upon its shaft a second sprocket-wheel 34, from which a chain 35 passes over a sprocket-wheel 36, the shaft of which is rotatable in a bearing 37 upon the inner side of the frame members 13. Upon this last-named shaft is a bevel gear-wheel 38, which meshes with a similar gear 39 upon a transverse shaft 40, rotatably mounted in bearings upon the side members. This shaft 40 has fast upon it a pinion 41, which engages a gear 42, fixed to the axle. As the harvester is advanced in use the rotation of the axle is communicated through the gearing to the conveyer-chains, moving them rearwardly to convey objects from the scoop to the mechanism, to be later described. It will be seen that the mounting of the sprocket-wheels of these conveyers upon springs allows them to adjust themselves to roots of varying thicknesses, even though there may be a considerable difference in diameter of those immediately succeeding one another. The adjustment of the springs through their supporting U-bolts and the blocks upon the frame also permits a bodily movement of the conveyers with relation to the scoop to provide for variations in the average length of the objects to be handled.

Mounted to turn about the shaft 40 are arms 43 43, situated just inside the frame F, and at the forward end of each arm is secured a plate 44, upon which are mounted cutters or knives 45, adjustably retained in place thereon by bolts, which pass through transverse slots 46 46 in the knives. This allows for a movement of the oppositely-curved cutting edges 47 toward and from one another. Upon a transverse shaft or rod 48, extending across the frame near the upper side of its forward end, are mounted to swing arms 49, carrying at their inner ends a contact member or gage 50, extending across the frame. The gage and knife supporting arms are connected by a link 51, the articulation of which at each end may consist of a pin passing through one of a series of holes 52 in each of the connected members and through a single corresponding hole in the link. The adjustment of said link to one portion or another of these members will vary the distance between the gage and the knife, and therefore the amount cut from the object operated upon. It will be evident from the position of the gage that the root in the grasp of the conveyer-chains will first contact with the gage, which will raise the knife with it, preserving a constant relation between the two whatever the position of the object in the conveyers.

At the under side of the frame F are journaled rolls 53 and 54, over which operates a slatted conveyer-belt 55, upon which the roots are dropped after the tops have been severed by the knives and carried rearwardly. This conveyer preferably delivers to a transverse conveyer or belt 56, one of the supporting-rolls 56$^a$ of which is shown as mounted in brackets 56$^b$, depending from one of the side members of the frame. The roll 54 is driven through a sprocket-wheel 57, from which a chain 58 passes over a larger wheel 59 upon the shaft 40. Fixed to the roll-shaft with the sprocket-wheel 57 is a bevel-gear 60, meshing with a similar gear 61 upon a short longitudinal shaft 62, journaled in bearings upon the frame and also carrying one element of spur-gearing 63, by which the shaft of the roll 56$^a$ is driven. This produces a travel of the conveyer 56, which may lead to a wagon or other suitable receptacle moving with the harvester.

Journaled at the end of the conveyer-chains and near the rear extremity of the machine, respectively, are rolls 64 and 65, over which operates a conveyer-belt 66, which serves to receive the tops after they are cut by the knives and deliver them through an opening in the side of a receptacle or box 67, supported upon the rear of the frame and provided with a suitable door 68, through which it may be emptied when convenient. Upon the shaft of roll 65 is a sprocket-wheel 69, driven by a chain 70 from a sprocket-wheel 71 upon the shaft of the roll 54. From the inner side of each of the frame members 13 near its upper edge projects a pin 72, extending into a slot 73 in one of opposite side members 74 74 of an upper frame F', these side members being joined near their forward extremity by a connecting-bar 75. This pin-and-slot connection between the two frames allows their angular relation to one another to be varied and the digging member raised or lowered, as will be hereinafter described.

Secured to the connecting-bar, preferably by an eyebolt 76, is a cross-bar 77. At each end of this cross-bar is rotatably mounted a spindle 78 of a pair of arms 79, between which are journaled supporting and steering wheels 80, here shown as of the caster type. Upon the upper end of each spindle is fixed a sprocket-wheel 81, and coacting with these wheels is a chain 82, which compels them to rotate together. At the center of the crossbar a vertical shaft 83 is rotatably mounted and carries opposite toothed sectors 83$^a$, here shown as formed upon the sides of a bevel-gear 84. With these sectors the chain 82 engages upon each side. With the gear 84 meshes a bevel-gear 85, fast upon the lower end of a steering-shaft 86, which, as here illustrated, occupies an inclined position and has a bearing in a pair of standards or brackets 87 87, projecting above the upper frame. Upon the upper end of the steering-shaft is a hand-wheel 88, located so it may be conveniently operated from a seat 89, mounted upon a bar 89$^a$, bridging the frame F'. Pivoted at 90 upon the inner side of each member 74, just to the rear of the connecting-bar, is an arm 91, to which is secured a bracket 92. Upon this bracket is mounted a cutter 92ª, which is here shown as a rotatable disk or colter. Each arm 91 preferably has a shifting connection with the swinging frame F, conveniently by means of a slot 93 in the arm, through which projects a pin 94, fixed in the frame. When the inclination of the frame F is varied, the pins will bear against the walls of the slots and raise or lower the disks proportionately. The inclination of the frame F may be altered to change the relation of the digging member to the earth and simultaneously move the disks by links 95, which may be pivoted at each end of the shaft 48 and be articulated at their opposite ends to lever-arms 96, fast upon a shaft 97, journaled on the frame F'. To this shaft 97 is also fixed a hand-lever 98, provided with a locking-lever 99 of suitable latch mechanism, which may engage a toothed sector 100, carried upon one of the members 74 and serving to secure the inclined frame in its adjusted position.

In the use of our improved harvester the tongue of a draft apparatus to which animals are harnessed may be secured to the eyebolt. The inclination of the frame F is then adjusted by the hand-lever until the scoop will enter the earth to such a depth that it will pass below substantially all the vegetables—for example, beets—which are to be removed from a row, as is shown in Fig. 4 of the drawings. This at the same time adjusts the position of the cutting-disks 92ª, which are situated just in advance of the cutting edges of the scoop and preferably in an inclined position, as is best shown in Fig. 1. These disks make a preparatory or entering cut for the scoop and at the same time, by virtue of their inclination, tend to press to one side a portion of the soil in the row. They also loosen and partially pulverize the earth and cut off the leaves at each side of the beet. As the machine advances, directed by the steering apparatus, which simultaneously turns the front wheels 80, the earth scooped out is forced up and rests upon the digging member, the beets remaining in substantially their natural position supported by the loosened earth. They are thus moved until they reach the conveyer-chains, which grasp them and, accommodating themselves to their thickness, move them rearwardly, the earth falling from the portion 16 of the scoop. This movement by the conveyers continues until the upper end of each beet contacts with the gage, which has been set to cause the knives to take a cut corresponding to the average height which the beets grow above the ground. The gage raises the knives, as has been hereinbefore described, and the beet is pressed against the cutting edges and the top removed. It now reaches the end of the conveyer-chains and is dropped therefrom, the root falling upon the lower conveyer and being delivered thereby to the transverse belt, which may raise them to a wagon. The top passes upon the upper conveyer and is dropped therefrom to the receptacle at the end of the frame.

This machine operates in an especially advantageous manner in the cutting and loosening of the earth and the turning away a portion at each side of the row by the disks, which both relieves the scoop and prepares the beet to be readily freed from the adhering soil; in maintaining substantially the natural position of the beet until it has been grasped by the conveyers, preventing its being presented to the topping-cutters in a wrong position; in the automatic adjustment of the cutters by the gage, which compels a fixed depth of cut without regard to the exact position of the beet, and in the ready adjustment of all the operating parts and their adaptability to varying conditions. Moreover, the frame is so arranged that it can be lightly yet strongly constructed, and the steering arrangement permits the turning from one side of the row to the other without the danger of straining the frame.

Having thus described our invention, we claim as new and desire to secure by Letters Patent—

1. The combination with an upper frame, of an inclined supporting-frame extending below the same, an arm pivoted upon the upper frame and connected with the inclined frame, and a cutter carried by the arm.

2. The combination with an upper frame, of an inclined frame extending below the same, an arm pivoted upon the upper frame and provided with a slot, a pin projecting from the inclined frame into the slot, and a cutter carried by the arm.

3. The combination with an upper frame, of an inclined frame extending below the same, a digging member carried by the inclined frame, arms pivoted upon opposite sides of the upper frame, said arms and the inclined frame being provided with coacting pins and slots, and cutters carried by the arms adjacent to the digging member.

4. In a harvester, the combination with a frame, of digging means, coöperating conveyers mounted in the frame, and means for adjusting said conveyers longitudinally of the frame.

5. In a harvester, the combination with a frame, of digging means, coöperating conveyers mounted in the frame, and means for adjusting said conveyers toward and from one another and longitudinally of the frame.

6. In a harvester, the combination with a frame, of digging means, coöperating conveyers mounted in the frame for bodily movement toward and from one another, and springs carried by the frame and upon the opposite ends of each of which the conveyers are supported.

7. In a harvester, the combination with a frame, of a spring-bar mounted thereon, wheels journaled upon the bar near its opposite ends, a conveyer carried by the wheel, and digging means mounted upon the frame.

8. In a harvester, the combination with a frame, of a spring-bar mounted thereon, wheels journaled upon the bar movable along the same, and a conveyer carried by the wheels, and digging means mounted upon the frame.

9. In a harvester, the combination with a frame, of a spring-bar mounted thereon, bearings movably mounted upon the bar, springs coacting with one of the bearings, wheels journaled in the bearings, a conveyer carried by the wheels, and digging means mounted upon the frame.

10. In a harvester, the combination with a frame, of a leaf-spring mounted thereon and having cylindrical threaded ends, opposite nuts coacting with said threads, bearings and contacting springs encircling the cylindrical ends between the nuts, wheels journaled in the bearings, a conveyer carried by the wheels, and digging means mounted upon the frame.

11. In a harvester, the combination with a frame, of a conveyer movable longitudinally thereof, a plurality of projections from the conveyer, situated in sets one above the other, the projections in said sets being of different lengths, and digging means mounted upon the frame.

12. In a harvester, the combination with a frame, of a conveyer movable longitudinally thereof and consisting of links, pairs of projections situated at opposite sides of the links, said projections being of different lengths, and digging means mounted upon the frame.

13. A harvester comprising means for moving objects therethrough, a cutter into contact with which the objects are moved, a movable support for the cutter, a gage movable by the objects, and means for pivotally connecting the cutter-support and gage.

14. A harvester comprising means for moving objects therethrough, a cutter into contact with which the objects are moved, a movable support for the cutter, a gage movable by the objects, and a link connecting the cutter-support and gage.

15. A harvester comprising means for moving objects therethrough, a cutter into contact with which the objects are moved, a movable support for the cutter provided with a series of openings, a gage movable by the objects and having a series of openings, and a link connected with one of each of the series of openings.

16. A beet-harvester comprising a digging member, conveyers for grasping the beet upon opposite sides and moving it from the digging member, means for adjusting the conveyers toward and from the digging member, and independent means for adjusting the position of the digging member and conveyers.

In testimony whereof we have signed our names to this specification in the presence of two subscribing witnesses.

JOHN W. BURTLESS.
JOHN W. LITTLE.

Witnesses:
JOHN E. KELLEY,
C. I. HALL.